April 8, 1952 — J. J. FODERMAIER, JR — 2,592,512
COLLAPSIBLE TOP
Filed Dec. 29, 1948 — 3 Sheets-Sheet 1
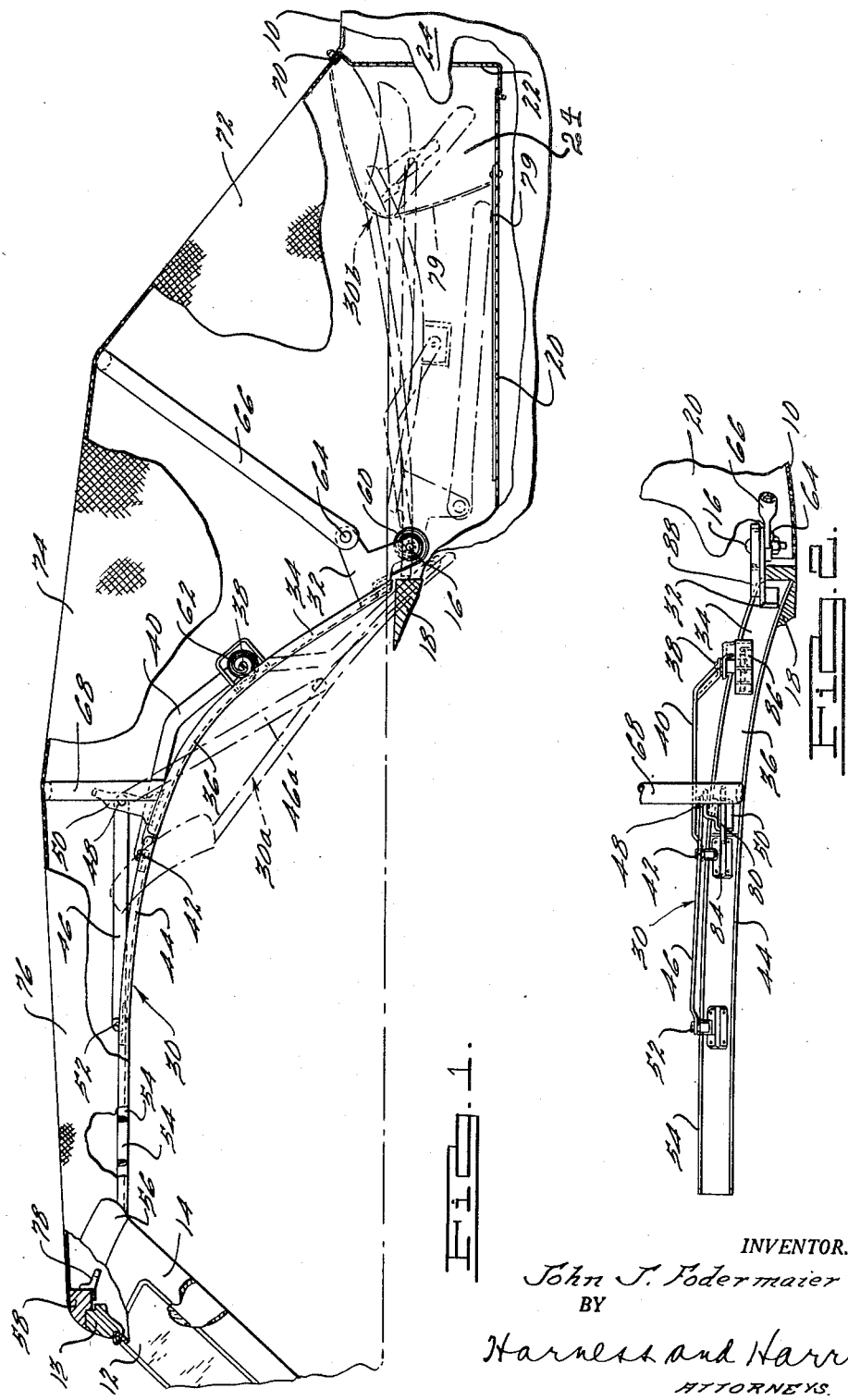
INVENTOR.
John J. Fodermaier Jr.
BY
Harness and Harris
ATTORNEYS.

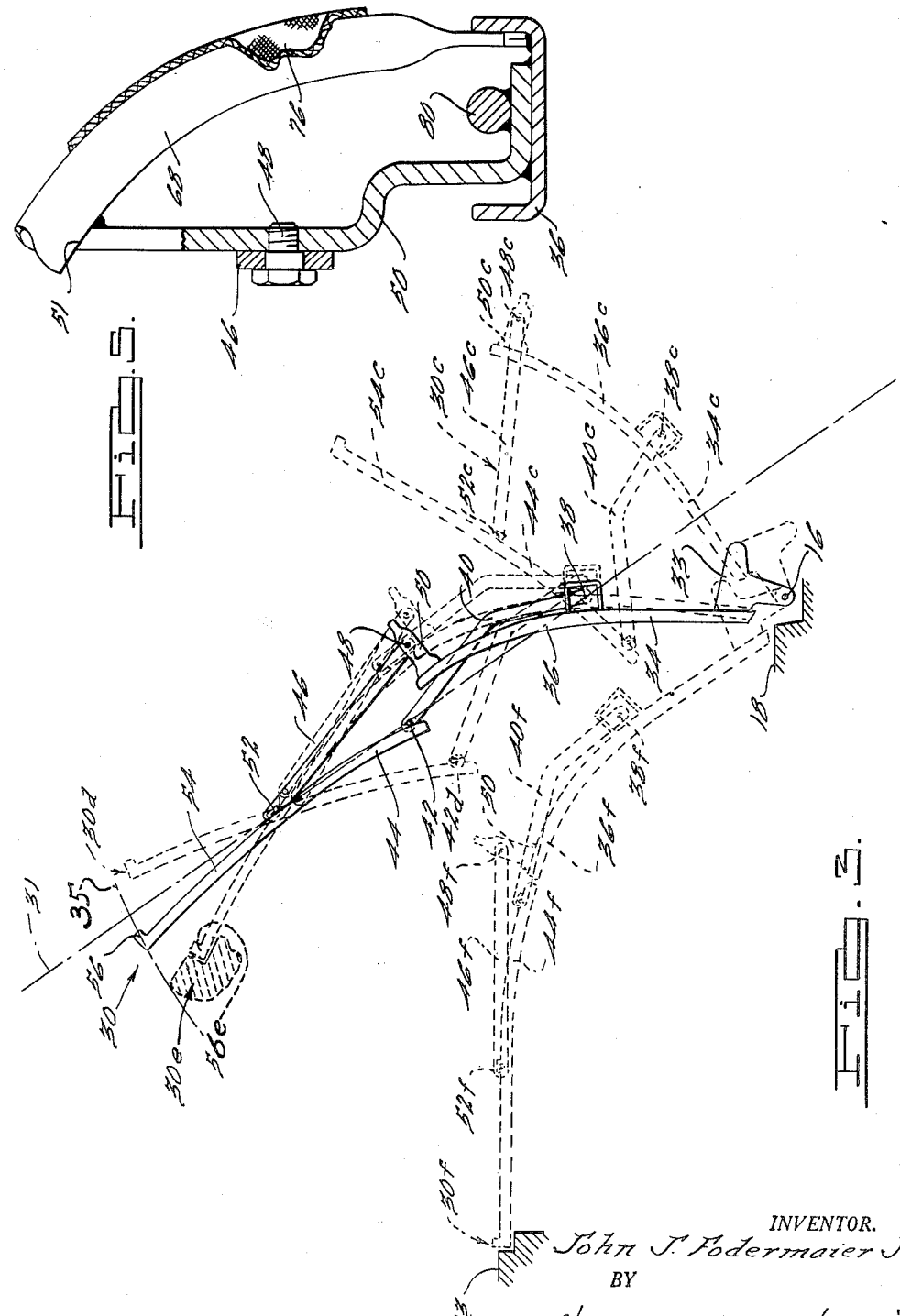

April 8, 1952   J. J. FODERMAIER, JR   2,592,512
COLLAPSIBLE TOP
Filed Dec. 29, 1948   3 Sheets-Sheet 3

INVENTOR.
John J. Fodermaier Jr.
BY
Harness and Harris
ATTORNEYS.

Patented Apr. 8, 1952

2,592,512

UNITED STATES PATENT OFFICE 2,592,512

COLLAPSIBLE TOP

John J. Fodermaier, Jr., Grosse Pointe, Mich., assignor to Chrysler Corporation, Highland Park, Mich., a corporation of Delaware Application December 29, 1948, Serial No. 67,876

4 Claims. (Cl. 296—116)

The present invention relates to improvements in collapsible or foldable tops, particularly the so-called convertible vehicle tops.

An object of the invention is to provide a top of the collapsible or foldable type which is relatively simple in structure and in which the number of connected links and levers has been reduced to a minimum and the arrangement thereof simplified and altered so that the top is easily raised or lowered, is positive in operation, yet is rigidly and firmly supported when in its raised position.

Another object of the invention is to provide a top of the foregoing character which is readily raised or lowered with a relatively small amount of effort and which may be easily operated manually.

Still another object is to provide a vehicle top of the collapsible or folding type which may be raised or lowered by continuous motion initiated by movement of the header bar and in which a balanced condition of the parts is maintained during the various stages of raising and lowering the top.

Another object is the provision of a folding top readily manipulatable from a folded and stored position to extended condition in one motion by the operator and with manual exertions requiring simply a one-hand operation. Such operation may be accomplished from within the vehicle by the operator as he occupies the seat, who after he has extended the top with one hand may then use his other hand to secure the free or header end thereof.

A further object is to produce a construction wherein ample compensation for the absence of any power unit is to be found in certain mechanical assist means and mode of balance and counter-balance such that the actual efforts required by the operator are virtually negligible.

A still further object is the provision of a supporting linkwork capable of assuming an overcenter locked up position which will insure rigidity sufficient to withstand collapsing loads wrought by vehicle body twisting and happenstance loading such as may be expected to be encountered during operation of the vehicle.

Yet a further object is to produce a top which though entirely satisfactory in its extended or "up" position may be folded to occupy a relatively small stowage space.

An additional object is to furnish for a folding top linkage certain mechanical assist means, as for example, spiral flat springs, so disposed that in event of the breakage or slippage thereof suitable surrounding brackets are present to prevent any damage or injury being caused by the springs. These springs serve the beneficial function of course, of relieving the exertions called for from the operator.

Other objects of this invention will appear in the following description and appended claims, reference being had to the accompanying drawings forming a part of this specification wherein like reference characters designate corresponding parts in the several views.

Fig. 1 is a fragmentary elevation partially in section showing the top construction of the present invention applied to a vehicle body of the conventional convertible type, the parts of the top being shown in full lines in the position they occupy when the top is in the raised position;

Fig. 2 is a fragmentary plan view showing the supporting chain on what may be considered the driver's side of the top with the parts occupying the positions corresponding to those appearing in Fig. 1;

Fig. 3 is a diagrammatic view showing in either full or dotted lines the essential parts of the chain of Fig. 2 in various of its kinematic dispositions;

Fig. 5 is a detail view in the vicinity of one of the bows for the chain of Figure 2.

Figure 4:
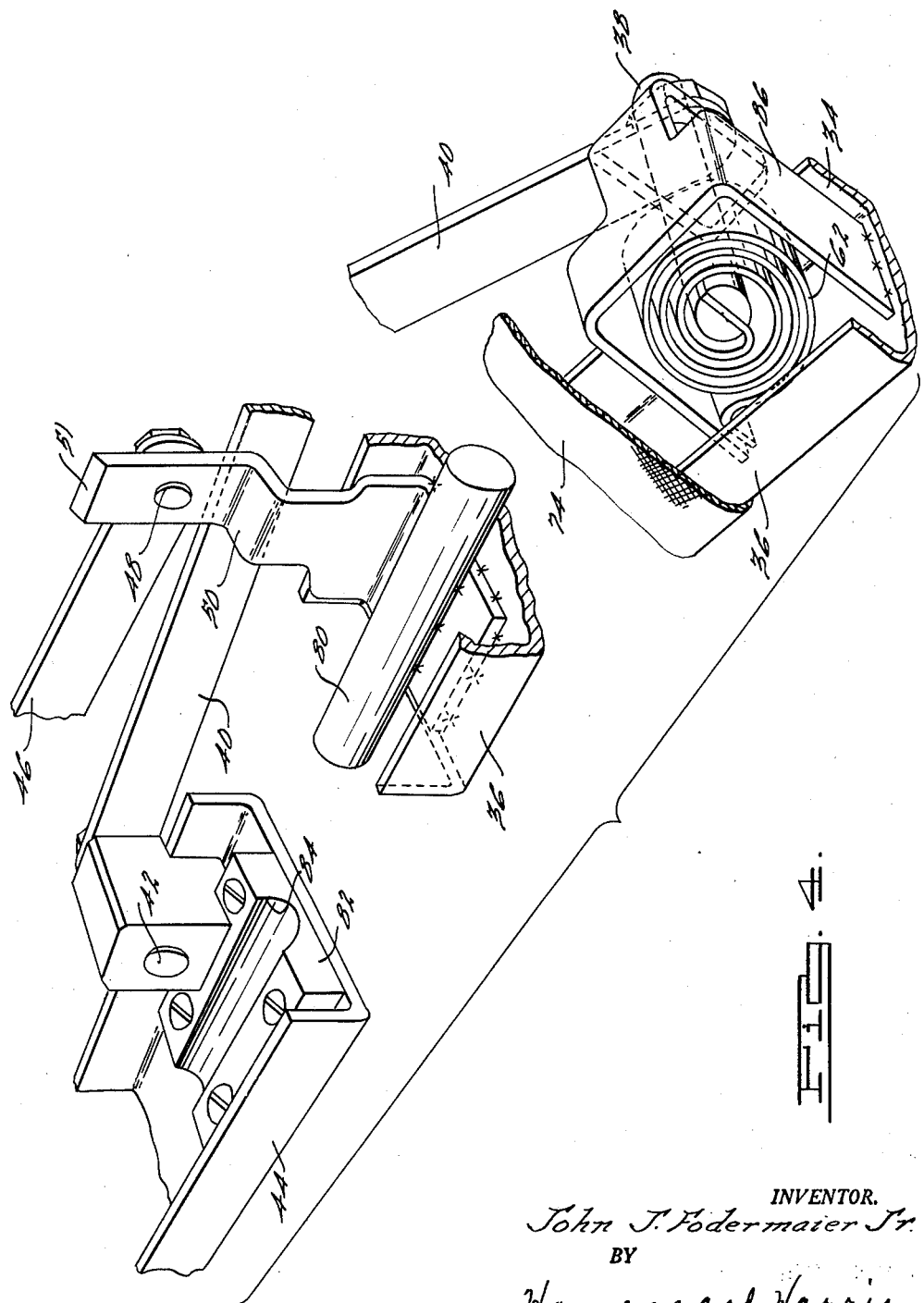
Fig. 4 is a perspective view of the components of the toggle joint and associated structure of Fig. 2.

As may properly precede the explanation in detail of the present invention, it is to be understood that the invention is not limited in its application to the details of construction and arrangement of parts illustrated in the accompanying drawings since the invention is capable of other embodiments and of being practiced or carried out in various ways. Also it is to be understood that the phraseology or terminology employed herein is for the purpose of description and not of limitation and it is not intended to limit the invention claimed herein beyond the requirements of the prior art.

A top embodying the present invention may be adapted for attachment to a vehicle body 10 such as may be provided in its forward portion with a windshield 12 and a windshield pillar 14, around the top of which parts may be installed a support molding 13. The top may comprise a framework attached to spaced pivotal brackets 16 which are disposed somewhat rearwardly of the windshield along with an abutment member 18 against which the framework is adapted to swing in movement about the brackets 16. In turn rearwardly of the brackets 16 there may be provided a horizontal member 20 and a vertical member 22 which serve to define a recess as between the respective sides 24 of the vehicle. It is within this recess that the top structure is adapted to be stowed. Such structure, generally indicated at 30, may comprise a member 32 connected so as to swing about pivot bracket 16. Rigidly carried by member 32 is another member 34 on to which is firmly affixed a member 36. At the junction of members 34 and 36 there may be provided a pivot 38 to which may be connected one end of a member 40. This member 40 may have at its opposite end a pivot 42 whereby it is connected to another member 44. An additional connecting member 46 will be observed to have a pivot point 48 by means of which it may be attached to an extension 50 of member 36. Member 44 bears a pivot 52 by which member 46 is swingably mounted therewith and is also joined to a member 54. Member 54 will be observed to connect with a header bar 56 which has a central portion as at 58. At certain junction points of the framework just set out, assist means are provided such as at 60 and 62. Such means may take the form of a flat spiral spring of a type similar to such as may be found serving as clock main springs.

Member 32 carries a pivot 64 upon which may be supported a transverse bow 66; another bow 68 may be provided as firmly affixed to member 36. From a point generally to the rear of the above described recess, such as at 70, may be found the beginning of a succession of spans 72, 74, and 76 of a flexible material which serves as a connecting covering over the respective bows and terminates at header 56. This header is adapted for movement relative to molding 13 through provision of a handle 78 by means of which the operator may extend the framework over the open space of the car in order to furnish suitable covering therefor. A strap 79 which occupies a position of attachment to the stowage recess may serve to anchor down the top when in collapsed position and prevent any rattling or free movement of the framework.

In Figure 1 particularly, will be seen one full line showing 30 of the top in extended position whereas the corresponding retracted position 30ª appears in phantom representation and the collapsed and stowed position 30ᵇ is shown by the same means. But consideration had best be had perhaps of Figure 3 for an understanding of the kinematics involved in the present invention. At once it will be apparent that member 36 serves as reference member of a constrained polygonal linkage of which the other members include 40, 44, and 46. This mechanism assumes the form of a four-bar or quadric-chain arranged to approach disposition as a parallelogram. However, close inspection will reveal that the parts are so proportioned that element 46 is approximately the longest of the four, and element 44 has the signal honor of being the shortest. The result of this construction is that a strict parallelogram is not involved; rather at all times the length of members 40 and 44 combined is exceeded by the effective lengths of 36 and 46 taken together. Hence the kinematic chain thus described may take a position wherein even though the toggle joint formed by 40 and 44 is fully extended the joint between members 36 and 46 will not be straightened completely out. Upon attainment of the situation where the toggle joint 42 of the turning pair 40, 44 is straightened out and then forced into an overcenter position, further movement may be prevented by virtue of existence of a conflicting abutment of two active members 36 and 44 of the chain.

The actual structure provided for such abutment is represented to best advantage in Figure 4. As the arm 40 acting under influence of spring 62 tends to sweep, through the medium of its toggle joint 42, the channel member 44 past the abutment of the channel member 36, an engagement will result which may necessarily involve member 80 seen welded to, but which may be otherwise affixed to the abutment member 36. Adapted to embrace member 80 may be a member 82 attached to the free end of member 44 and defining a complementary recess 84 for such reception. Any further movement of the toggle joint 42 in an upward direction is precluded due to the just-described engagement between the cooperating parts 80, 82.

In connection with Figure 5, bow 68 is shown as it would appear from a direction forward of the driver's position of the car and looking toward the rear thereof. Bow 68 and the extension 50 of member 36 do not originate in transverse alignment actually but the member 50 is slightly in the more forward position. However, since the members do not angle in identical directions from the base member 36 it becomes possible that member 68 crosses over the upper portion of extension 50 adjacent face 51 to rest thereon. The bow may thus be afforded an additional point of support on the member 36 in order that proper rigidity may be secured.

In respect of the actual operation of the top as begins with the stowed position of Figure 1, after stowage strap 79 is released the handle 78 at the central portion of the header bar may be grasped and with the aid perhaps of the assist means 60, the top may be rotated to the retracted position 30ª where it abuts vehicle body part 18. From such position the header may be moved toward the windshield pillar, abutting member 34 acting itself as a pillar thereby permitting extension of the kinematic chain. The operator is at all times required to use only one hand for this operation and as he nears molding 13 with the header, the assist means 62 may be found to come into play. These assist means 62 will be seen as in Figure 2 to occupy the enclosed space within a bracket 86 as will also assist means 60 be seen to occupy an enclosed space in a corresponding surrounding bracket 88.

From a position corresponding to the showing 30ª in Figure 3, the action of assist means 62 will become pronounced in their attempting to force the toggle members 40 and 44 into opened out position as indicated at 30. Under the continued urging of the assist means, toggle joint 42 will from that point be influenced to assume the overcenter position as will correspond to 30ᵉ or 30ᶠ. Any further movement will be prevented by the bar and recess members previously described by their coming into registry. An examination of Figure 3 will reveal that in full line position 30 the header member 56 is actually in its most extended or overhung position. That is to say, in order to bring the pivot points 38, 42, and 52 into aligned position the top takes a certain overhanging position never otherwise attained. Hence to go to overcenter position the top must in effect be retracted somewhat and after it takes its position of attachment to the molding over the windshield pillar, the toggle joint is not then free to be broken back into its collapsed position. Some appropriate means may be provided to lock the header 56 firmly to molding 13 or to the windshield pillars themselves 14 in order to prevent any collapse of the framework other than when desired. The position 30e, as shown, corresponds to the actual attached position 30f represented in Figure 3.

For purposes of collapsing this framework, inasmuch as the toggle joint will not be straightened out until the header end 56 is allowed to sweep out beyond the confines of molding 13, the member 54 must necessarily be swung up through an arc of a few degrees in order to provide the necessary clearance. From that point on, the operator is afforded a certain torque multiplication advantage as over the resisting assist member 62 which inherently opposes any movement toward collapsed position. The member 44 as specified is shorter than the the lever arm 40 by means of which activity of the assist means is manifested; accordingly, joint 42 may be broken past its aligned position in a relatively simple fashion. In progression, from the full position 30 the framework may assume a position corresponding to 30d and ultimately may attain a much similar position to that indicated at 30c. The top may then be fully collapsed and rotated as against any resistance of assist means 60 to occupy the recess behind the pivot brackets. Thereupon the assist strap 79, attachable at one end to the recess member as desired, and at the other end adjacent a rear portion 79 of the vehicle body, may be used to serve to hold down the top against the urgings of means 60 and prevent any undue shifting around of the top when it is in stowed position.

From the foregoing description it will be apparent that the top construction of the instant invention is greatly simplified as contrasts tops previously suggested for manual operation and is even more greatly simplified as respects power-operated tops. By proper choice of rate and preset stress in the assist means, the pull required to promote movement of the framework may be reduced to as few pounds magnitude as desirable, to the end that the structure offers practically the same advantages during actual operation as do the expensive tops of the power-operated type. It will be seen that the top here provided conforms to the outside contours of the usual vehicle window opening such that there is no impairment of vision through the window by links, levers, or other members of the top frame structure.

What is claimed is:

1. A manually operated top for vehicle bodies and the like which include a front support pillar and a pivot bracket toward the rear of the vehicle body in spaced relation to the support pillar, said top comprising a first channel member having means for pivoting one end thereof on a fixed axis to said pivot bracket, a spiral spring carried at the said end of the channel member and biasing the channel member to swing in a direction toward the support pillar thereby extending the top, a hand operated header bar detachably connected to the support pillar, a second channel member affixed at one end to the header bar, the other ends of the respective channel members being arranged such that the channel members are adapted to be disposed end to end in mutual alignment conforming to external contours of a window opening when the top is erected, an engaging part and a complementary recessed engageable part carried by the respective said other ends of the channel members and cooperating when brought into mutual engagement to insure transverse registration between the said other ends of the channel members and insuring a continuous channel surface along the contours of the window opening, and a link pivoted to each channel member at an intermediate portion of the latter, and pivoted at an inner free end thereof to the said other end of the other channel member.

2. A manually operated top for vehicle bodies and the like which include a front support pillar and a pivot bracket toward the rear of the vehicle body in spaced relation to the support pillar, said top comprising a first channel member having means for pivoting one end thereof on a fixed axis to said pivot bracket, a spiral spring carried at the said end of the channel member and biasing the channel member to swing in a direction toward the support pillar thereby extending the top, a hand operated header bar detachably connected to the support pillar, a second channel member affixed at one end to the header bar, the other ends of the respective channel members being arranged such that the channel members are adapted to be disposed end to end in mutual alignment conforming to external contours of a window opening when the top is erected, an engageable portion carried by each of the respective other ends of the channel members and mutually cooperating when brought into engagement to insure transverse registration between the channel members and insuring a continuous channel surface at the end to end juncture of the channel members along the contours of the window opening, and a link pivoted to each channel member at an intermediate portion of the latter, and pivoted at an inner free end thereof to the said other end of the other channel member, the link pivot to the other end of the second channel member being in a position slightly past center with respect to conforming to alignment with the respective link pivots to the intermediate portions of the channel members when said cooperating engageable portions establish the mutual engagement aforesaid.

3. A manually operated top for vehicle bodies and the like which include a front support pillar and a pivot bracket toward the rear of the vehicle body in spaced relation to the support pillar, said top comprising a first channel member having means for pivoting one end thereof on a fixed axis to said pivot bracket, a spiral spring carried at the said end of the channel member and biasing the channel member to swing in a direction toward the support pillar thereby extending the top, a hand operated header bar detachably connected to the support pillar, a second channel member affixed at one end to the header bar, the other ends of the respective channel members being arranged such that the channel members are adapted to be disposed end to end in mutual alignment conforming to external contours of a window opening when the top is erected, an engageable portion carried by each of the respective other ends of the channel members and mutually cooperating when brought into engagement to insure transverse registration between the channel members and insuring a continuous channel surface at the end to end juncture of the channel members along the contours of the window opening, and a link pivoted to each channel member at an intermediate portion of the latter, and pivoted at an inner free end thereof to the said other end of the other channel member, the link pivot to the intermediate portion of the first channel member carrying a second spiral spring acting at all times to bias the adjacent link in a direction such as to swing the other end of the second channel member and bring the engageable portion on the said other end of the second channel member into the mutual engagement aforesaid as said top is being extended, the link pivot to the said other end of the second channel member being positioned slightly past center with respect to aligning with the respective link pivots to the intermediate portions of the channel members when the engageable portions effect mutual engagement and tending to be forced into the past center position owing to the above described continuous biasing action of said second spiral spring.

4. For use with vehicle bodies and the like characterized by a relatively spaced front support pillar and rear bracket having a window opening intervening and a header bar detachably connected to the support pillar, a manually-operated collapsible top linkwork comprising a pair of channel members adapted to be juxtaposed end to end so as to bridge the space between pillar and bracket coextensively with the window opening, a pivot carried by one of the relatively outer ends of the channel members for pivoting the associated channel member to the bracket for swinging movement about a fixed axis, means carried by the other of the outer ends for positively connecting the other channel member to the header bar, cooperating parts carried by each of the juxtaposed ends of the channel members engageable to establish alignment between the channel members to prevent motion of said other channel member past the juxtaposed end of the first-named channel member, and a link connected at one end to each of the channel members at an intermediate portion of the latter and connected at the opposite end to a said juxtaposed end of a different one of the channel members and being arranged to constrain the motion of the channel members relative to one another when the resulting manually-operated linkwork is collapsed.

JOHN J. FODERMAIER, Jr.

REFERENCES CITED

The following references are of record in the file of this patent:

UNITED STATES PATENTS

| Number | Name | Date |
|---|---|---|
| 1,952,252 | Heuser | Mar. 27, 1934 |
| 1,981,060 | Miller | Nov. 20, 1934 |
| 2,066,231 | Salmons et al. | Dec. 29, 1936 |
| 2,076,243 | Marshal et al. | Apr. 6, 1937 |
| 2,176,131 | Haberstump | Oct. 17, 1939 |
| 2,213,222 | Keller | Sept. 3, 1940 |
| 2,272,299 | Ingildsen | Feb. 10, 1942 |
| 2,323,547 | Levon | July 6, 1943 |
| 2,362,939 | Simpson | Nov. 14, 1944 |
| 2,365,765 | Keller | Dec. 26, 1944 |